(12) United States Patent
Nordström et al.

(10) Patent No.: US 6,715,811 B2
(45) Date of Patent: Apr. 6, 2004

(54) CLAMP DEVICE FOR A TARPAULIN HANDLING MACHINE

(75) Inventors: Lars-Ingvar Nordström, Lund (SE); Thomas Loeb, Karlshamn (SE)

(73) Assignee: Lars-Ingvar Nordström, Lund (SE)

( * ) Notice: Subject to any disclaimer, the term of this patent is extended or adjusted under 35 U.S.C. 154(b) by 51 days.

(21) Appl. No.: 10/055,958

(22) Filed: Jan. 28, 2002

(65) Prior Publication Data

US 2002/0109366 A1 Aug. 15, 2002

(30) Foreign Application Priority Data

Feb. 9, 2001 (SE) .......................................... 0100402-7

(51) Int. Cl.[7] .................................................. B66C 1/48
(52) U.S. Cl. ....................................... 294/106; 294/81.6
(58) Field of Search ................................. 294/81.6, 101, 294/103.1, 104, 116, 112, 902, 102.1; 198/803.14, 803.3, 803.7; 52/730.1; 901/31, 39

(56) References Cited

U.S. PATENT DOCUMENTS

| 489,782 A | * | 1/1893 | Bahret .......................... 294/101 |
| 1,182,313 A | * | 5/1916 | Sola .......................... 294/103.1 |
| 1,312,926 A | * | 8/1919 | Sherman .................. 294/103.1 |
| 1,976,848 A | * | 10/1934 | Ham ........................ 294/103.1 |
| 2,387,408 A | * | 10/1945 | Pertuit ...................... 294/102.1 |
| 2,654,630 A | * | 10/1953 | Renfroe ....................... 294/104 |
| 2,654,631 A | * | 10/1953 | Renfroe ....................... 294/104 |
| 3,197,251 A | * | 7/1965 | Travis, Jr. .................... 294/104 |
| 3,239,263 A | * | 3/1966 | Farmer et al. .............. 294/19.1 |
| 3,262,579 A | * | 7/1966 | Reich ........................... 211/45 |
| 3,300,242 A | | 1/1967 | Renfroe |
| 4,162,804 A | * | 7/1979 | Davies ........................ 294/101 |
| 4,498,699 A | * | 2/1985 | Davies ........................ 294/101 |
| 4,834,442 A | | 5/1989 | Choung |
| 4,884,836 A | * | 12/1989 | Maye et al. ................. 294/101 |
| 5,226,688 A | * | 7/1993 | Russo et al. ................. 294/104 |

FOREIGN PATENT DOCUMENTS

| FR | 1518153 | * | 2/1968 | ................. 294/104 |
| FR | 2478053 | * | 9/1981 | ................. 294/104 |
| SU | 162280 | * | 1/1991 | ............. 294/103.1 |

* cited by examiner

*Primary Examiner*—Eileen D. Lillis
*Assistant Examiner*—Paul T. Chin
(74) *Attorney, Agent, or Firm*—Breiner & Breiner, L.L.C.

(57) ABSTRACT

A clamp device (1) is intended for connecting a tarpaulin (23) to a movable beam assembly (25) in a tarpaulin handling machine. The clamp device (1) has as its clamping member a freely rotatable, eccentric roller (4) adjacent a base member (7), the tarpaulin being inserted between the roller and the base member and held there by the roller.

8 Claims, 4 Drawing Sheets

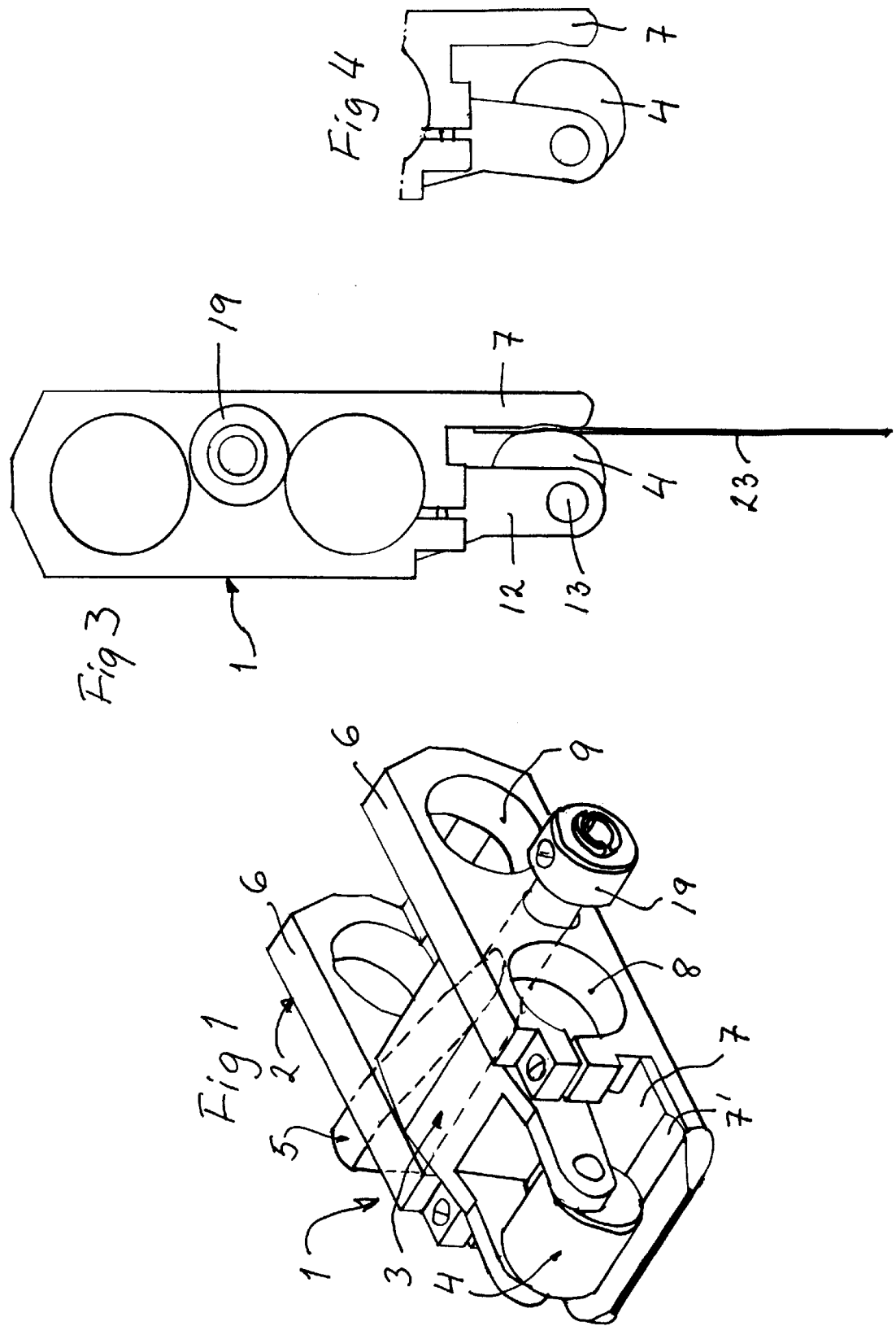

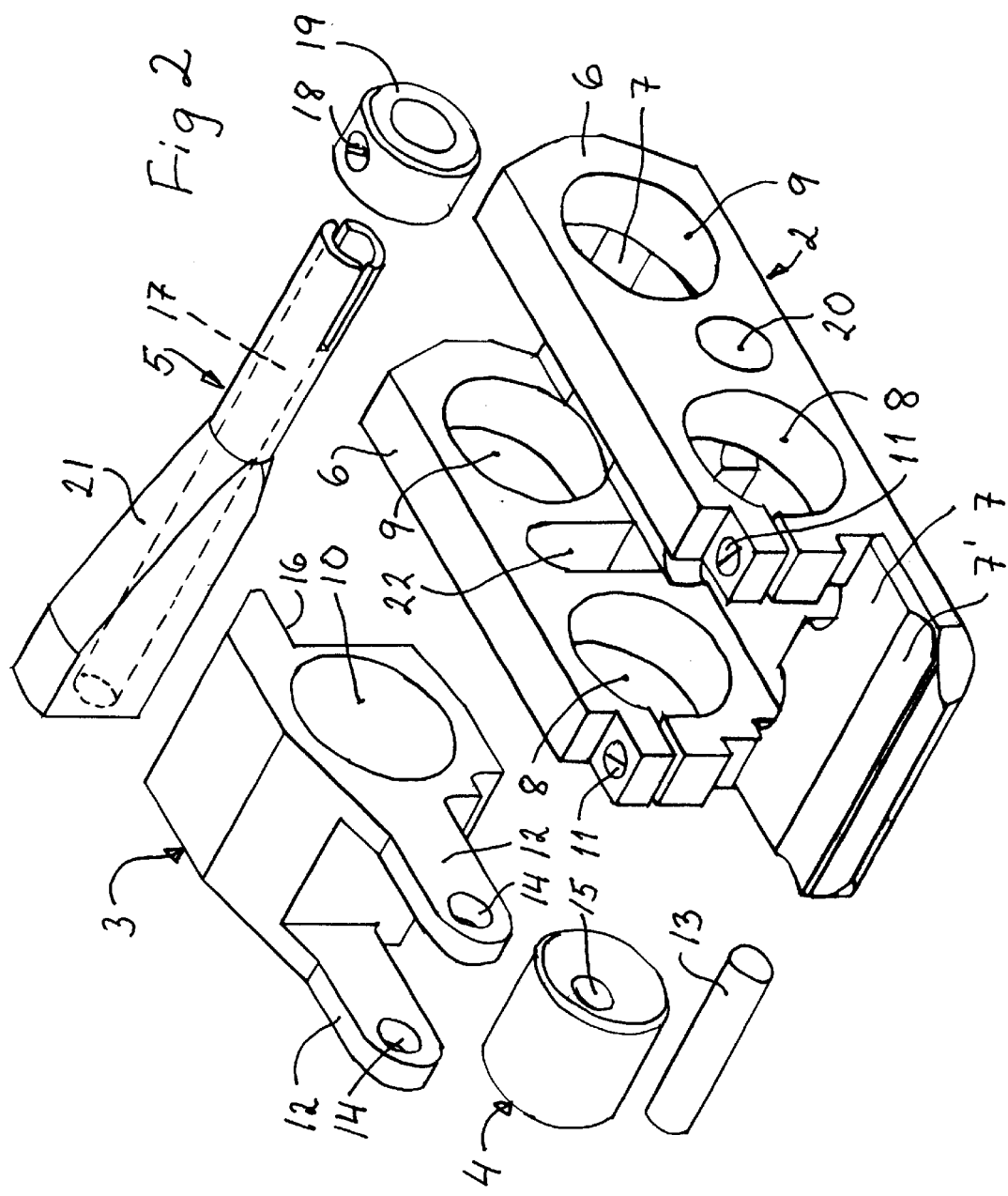

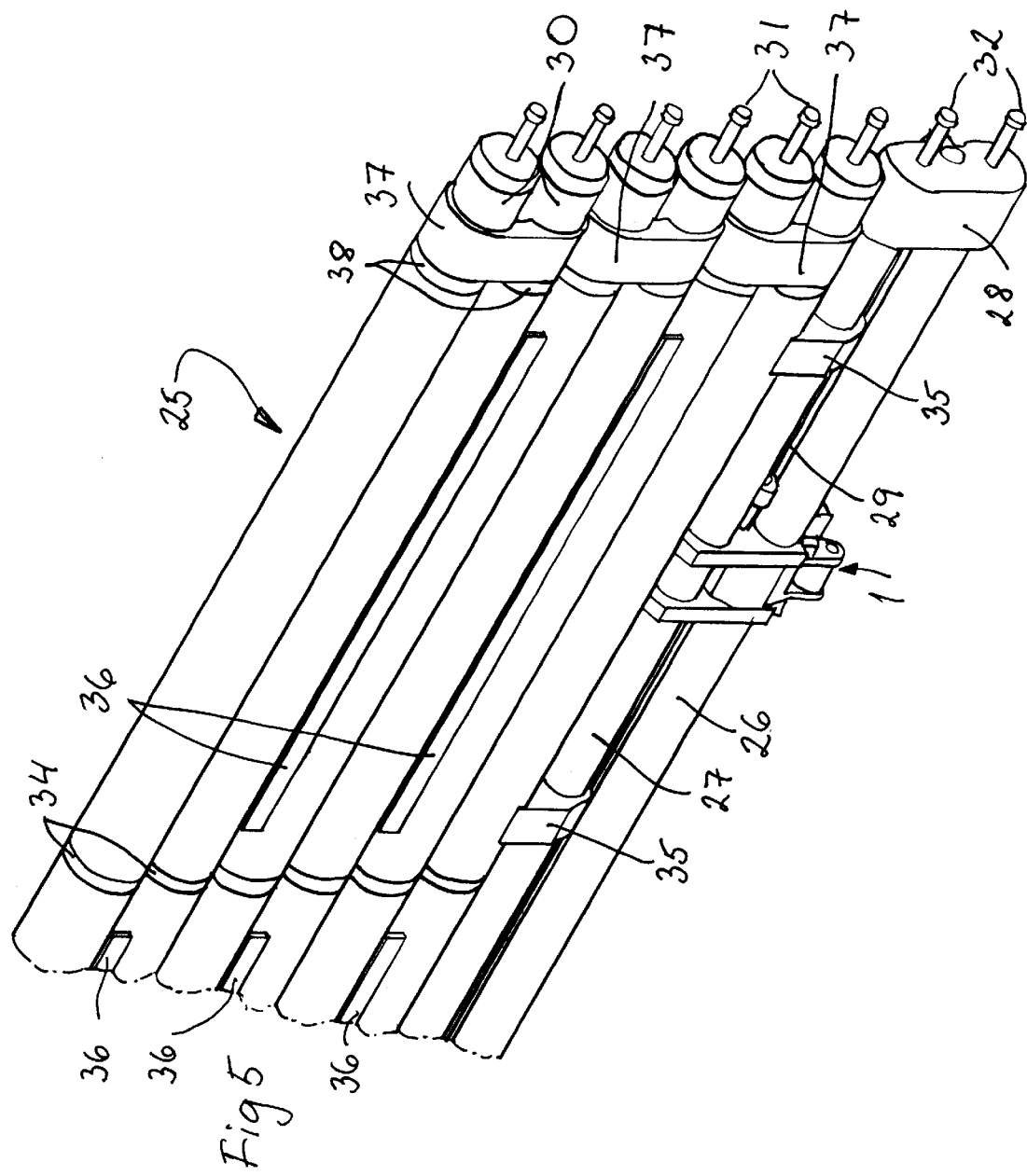

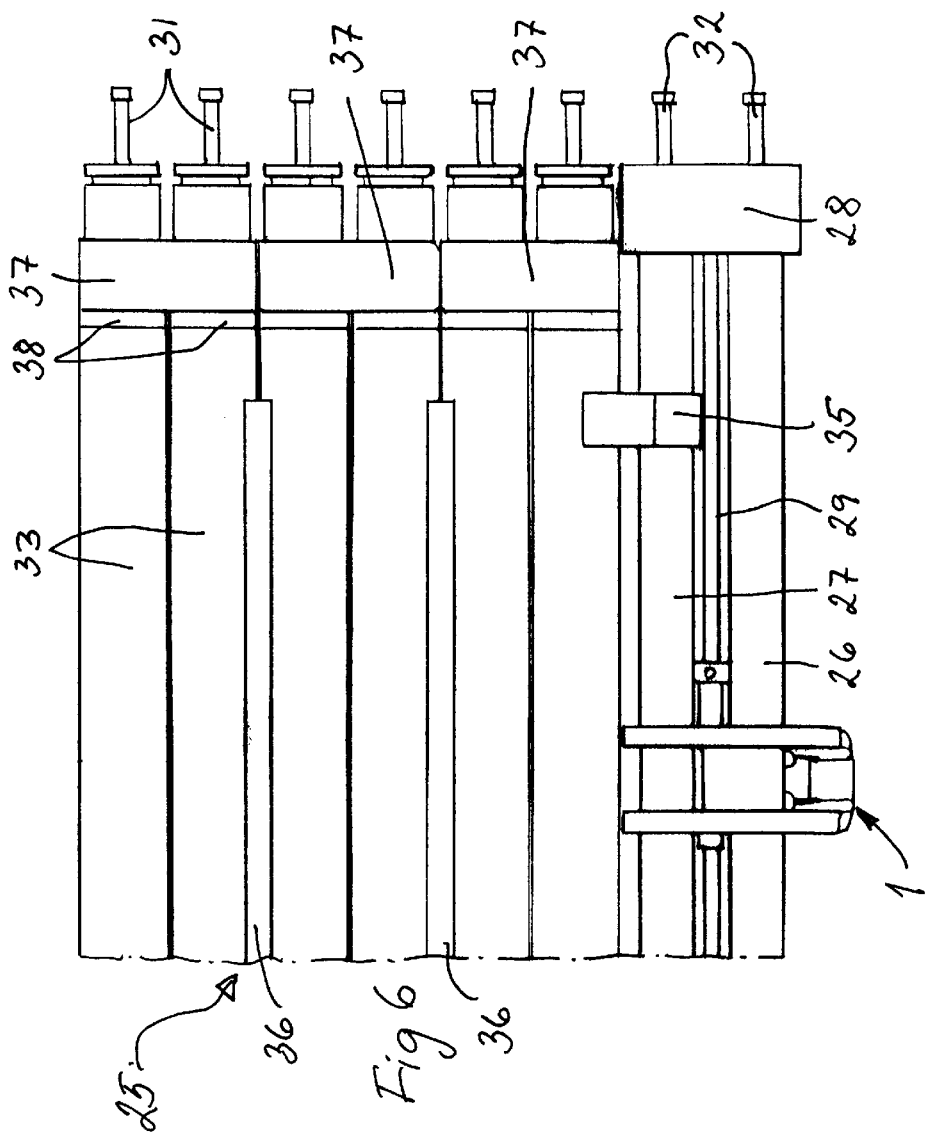
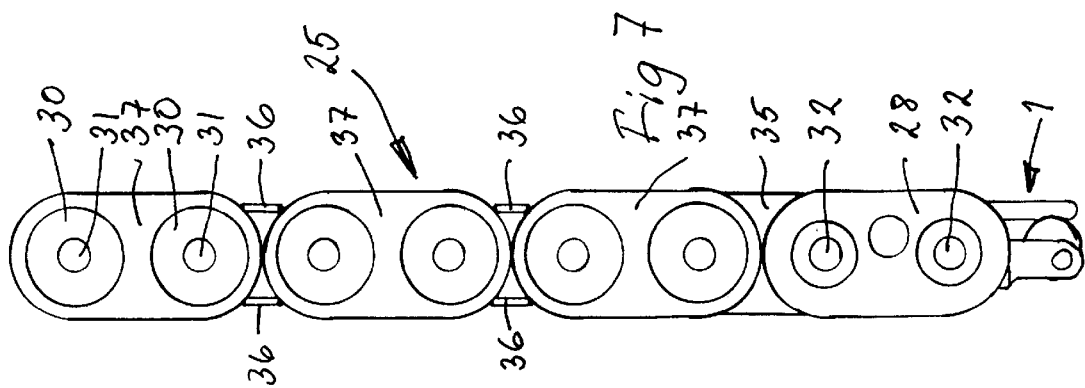

CLAMP DEVICE FOR A TARPAULIN HANDLING MACHINE

TECHNICAL FIELD

The present invention relates to a clamp device for connecting a tarpaulin or the like to a movable beam assembly in a tarpaulin handling machine.

BACKGROUND OF THE INVENTION

Tarpaulins are used for a variety of purposes, where they are exposed to wear, tear and dirty environments. Tarpulins are often very big and heavy, and a tendency towards even bigger sizes may be noted, for example tarpaulins with a width of 8 m or more and a length of 20 m or more.

There is a need to handle tarpaulins for washing or cleaning or for inspecting them on large backlit surfaces. In washing machines or inspection machines, the tarpaulin may be attached or connected to a beam assembly, which moves the tarpaulin mechanically through the machine.

Connecting devices are used for connecting the tarpaulin to the beam assembly. Examples of such connecting devices are hooks or clamps, in the latter case for example mechanical, spring-biassed clamps or pneumatically controlled clamps.

The requirements on such connecting devices are that they shall provide a safe connection in spite of the great weight of the tarpaulin (for example 600 kg or more), they shall be as easy to handle as possible, both for connection and for later disconnection, they shall be able to withstand the environmentally harsh conditions in a washing machine, and they shall be as uncomplicated and cheap as possible.

THE INVENTION

These requirements may be fullfilled by a clamp device according the invention having as its clamping member freely rotatable, eccentric roller adjacent a base member.

The edge of the tarpaulin is inserted in a vertical or inclined position between the eccentric roller and the base member, and this free insertion is admitted in that the roller rotates in the insertion direction. When the tarpaulin is freed, its weight will accomplish a backwards rotation of the roller, and by eccentricity of the roller, a clamping action on the tarpaulin is automatically obtained. The clamping force is increased with increased weight of the tarpaulin.

An improved clamping action between the roller and provided with a groove, which is coaxial with the roller and preferably is cylindrical, for cooperation with the roller.

The engagement of the roller with the tarpaulin may be improved in that the roller has a knurled, serrated or corrugated surface.

The roller may be arranged on a clamp arm pivotably mounted in the clamp device. In a practical case, the clamp arm is pivotably mounted on a beam assembly tube, on which the clamp device is attached. The pivotable arrangement of the clamp arm will enable an opening of the clamp device for releasing the tarpaulin at the end of its processing in the handling machine.

For controlling the pivoting of the clamp arm, it may be engaged with a control member, which is movable between a position, in which the clamp device is operative for connecting the tarpaulin, and a position, in which the clamp device may release the tarpaulin.

Practically, the clamp arm may have a shoulder for engagement with the control member, which is axially movable in the clamp device and has an inclined control surface.

When the shoulder is en engagement with the control surface, the control arm is held in the clamping position, and after axial displacement of the control member the control arm can be pivoted for disconnecting the tarpaulin.

Normally, several clamp devices—in a practical case twelve clamp devices—are arranged in a row on the beam assembly. The different clamp devices may in such a case be concurrently controlled in that the control members of the different clamp devices are connected by means of a common control rod, which preferably may be operated by means at the end of the beam assembly.

BRIEF DESCRIPTION OF THE DRAWINGS

The invention will be described in further detail below under reference to the accompanying drawings, in which FIG. 1 is a perspective view of a clamp device, therefore, FIG. 2 is an exploded view of the same device to a larger scale, FIG. 3 is a side view of the clamp device in a closed position holding a tarpaulin, FIG. 4 is a corresponding side view of a portion of the clamp device in an open position, FIG. 5 is a perspective view of a portion of a flexible beam assembly, provided with clamp devices of FIG. 1, FIG. 6 is a plan view of the beam assembly of FIG. 5, and FIG. 7 is a side view of the beam assembly of FIG. 5 to a larger scale.

DETAILED DESCRIPTION OF PREFERRED EMBODIMENT

A clamp device 1 is shown in FIG. 1 in an assembled condition and in FIG. 2 to a larger scale and in an exploded view. In FIG. 1, its position is open.

The clamp device 1 has basically a body 2, a clamp arm 3 pivotally arranged in relation thereto, a roller 4 rotatably attached in the clamp arm 3, and an axially movable control member 5.

The body 2 has two sidewalls 6 and a bottom 7, which in the practical case is partly open. The sidewalls have two pairs of coaxial bores 8 and 9 for tubes to be described. The clamp arm 3 has a through bore 10 with substantially the same diameter as the sidewall bores 8. A tube inserted through the bores 8 and the clamp arm bore 10 will act as a pivot for the clamp arm 3. A lip-shaped portion of the bottom 7 extending forward past the sidewalls 8 has a part-cylindrical groove 7' for a purpose to be described. The sidewalls 6 are as shown slotted adjacent to the bores 8, so that the body 2 can be fastened by a clamping force excerted by screws 11 to a tube inserted in the bores 8.

The clamp arm 3 has two yokes 12 extending forward or to the left in FIGS. 1 and 2, and the roller 4 may be rotatably attached to the yokes 11 by means of a shaft 13 in yoke holes 14 and in an eccentrically positioned through hole 15 in the roller 4.

In its portion extending to the right in FIGS. 1 and 2 the clamp arm 3 has a shoulder 16 for cooperation with the axially movable control member 5. The control member 5 has a through bore 17 (FIG. 2) for a control rod to be described. The control member 5 is cylindrical to the right in FIG. 2 and is there slotted, so that it may be attached to the control rod by means of a screw 18 in an attachment ring 19. One of the sidewalls 6 has a through hole 20 for the cylindrical part of the control member 5.

The remaining part of the control member 5 has a generally parallelepipedical shape with an inclined land 21 or control surface for cooperation with the clamp arm shoulder 16. The parallelepipedical part of the control member 5 is guided for axial movement only by a through opening 22 with a corresponding shape in the other sidewall 6.

When moved to the right in FIGS. 1 and 2, the control member 5 will engage the clamp arm shoulder 16 by means of its inclined land 21 and move the clamp arm yokes 12 with the roller 4 towards the bottom 7.

In this condition shown in FIG. 3, the roller 4 is applied against the bottom groove 7' with a force caused by its eccentricity and its weight. The edge of a tarpaulin 23 may be inserted practically without resistance between the roller 4 and the bottom 7 but when let loose will be securely clamped to the bottom 7 by the eccentricity of the roller 4 under the action of the tarpaulin weight.

When it is desired to release the tarpaulin 23, the control member 5 is moved to the left in FIGS. 1 and 2, so that the control arm 3 is free to move to its open position shown in FIG. 4, where the roller 4 no longer is in engagement with the bottom groove 7'. Hereby, a clamping force is no longer applied to the tarpaulin 23.

A beam assembly 25 is shown in FIGS. 5–7. The purpose of this beam assembly is to be rigid enough to withstand bending under the weight of a large tarpulin with a width of 8 m or even more and a length of 20 m or more and still be flexible for allowing movement around sprockets of a tarpaulin washing or inspection machine.

In its lower part the beam assembly 25 has two clamp device tubes 26 and 27 for mounting the clamp devices 1. The clamp devices 1, of which only one is shown in each of the FIGS. 5–7, are preferably evenly distributed along the length of the beam assembly 25, and their number depends on the beam assembly length. In a practical case, however, the number is twelve.

The lower clamp device tube 26 extends through the bores 8 of the clamp devices 1 and the clamp arm bores 10, whereas the upper tube 27 extends through the clamp device bores 9. At each end the two tubes 26 and 27 are connected by means of an end piece 28.

A control rod 29 extends from the end piece 28 between the two clamp device tubes 26 and 27. The different control members 5 of the clamp devices 1 are attached to this control rod 29, which may be axially transferred by means (not shown) in the end piece 28 for accomplishing a concurrent opening and closing function of all the clamp devices 1 as described above.

The beam assembly 25 further comprises a number of through beam rods 30 (which may in fact be tubular or hollow). In the shown example the number of such rods is six. At each end each rod is provided with an attachment pin 31 for a chain (not shown) to be laid over sprockets in the tarpaulin washing or inspection machine. Corresponding attachment pins 32 are arranged on the end pieces 28.

Beam tubes 33 are threaded over the beam rods 30 in a way to be described. Rotational movements are admitted between the beam rods 30 and the beam tubes 33, and the beam tubes 33 may be provided with means (not shown) for introducing lubricant between the rods and the tubes.

The length of each beam tube 33 is limited. In the example with twelve clamp devices 1, there may be twelve beam tubes 33 to cover the entire length of each beam rod 30. Rings 34 for handling horisontal forces are preferably arranged between adjacent beam tubes 33.

In the beam assembly section shown in FIG. 5 the first or lowermost beam tube 33 is connected to the upper clamp device tube 27 by means of two loops 35, one at each side of the clamp device 1. The second and third beam tubes 33 are connected by means of welded strips 36, which also applies for the fourth and fifth tubes. The sixth and uppermost tube 33 is not connected to any other tube. In the chosen example, the above description is true also for sections three, five, seven, and so forth, i.e. each section with a clamp device 1.

Further, beam rods one and two; three and four; and five and six are mutually connected by means of connection pieces 37 at each end. Rings 38 for handling horisontal forces are provided between the respective beam tubes 33 and the connection pieces 37.

In the second section, which is shown to the left in

FIG. 5, beam tubes one and two; three and four; and five and six are respectively connected by means of welded strips 36. The first or lowermost beam tube 33 is not connected to made also for section four, six, eight, and so forth.

By the shown and described design the forces from the weight of the carried tarpaulin, which may amount to for example 600 kg, are evenly distributed over the different rods and tubes in the beam assembly with a considerable height, at the same time as the beam assembly will be flexible enough to act as a chain at passing over sprockets in the tarpaulin washing or inspection machine.

What is claimed is:

1. A clamp device for connecting a tarpaulin to a movable beam assembly in a tarpaulin handling machine comprising a clamping member having a freely rotatable eccentric roller adjacent a base member, the roller and the base member being arranged with respect to each other to allow insertion of a tarpaulin between the roller and the base member and allow rotation of the roller and clamping of the tarpaulin by gravity forces, wherein the base member has a groove which is coaxial with the roller for cooperation with the roller.

2. A device according to claim 1, wherein the roller is pivotally arranged on a clamp arm in the clamp device.

3. A device according to claim 2, wherein the clamp arm is pivotably mounted on a beam assembly tube to which the clamp device is attached.

4. A device according to claim 3, wherein the clamp arm is engaged with a control member which is movable between a position in which the clamp device is operative and a position in which the clamp device releases the tarpaulin.

5. A device according to claim 4, wherein the clamp arm has a shoulder for engagement with the control member which is axially movable in the clamp device and has an inclined control surface.

6. A device according to claim 5, wherein a plurality of clamp devices are present and arranged in a row on the beam assembly, and the control member of each said clamp device is connected to each other by a common control rod.

7. A device according to claim 6, wherein a means at an end of the beam assembly is present for operating the control rod.

8. A device according to claim 1, wherein the roller is cylindrical.

* * * * *